Patented July 1, 1930

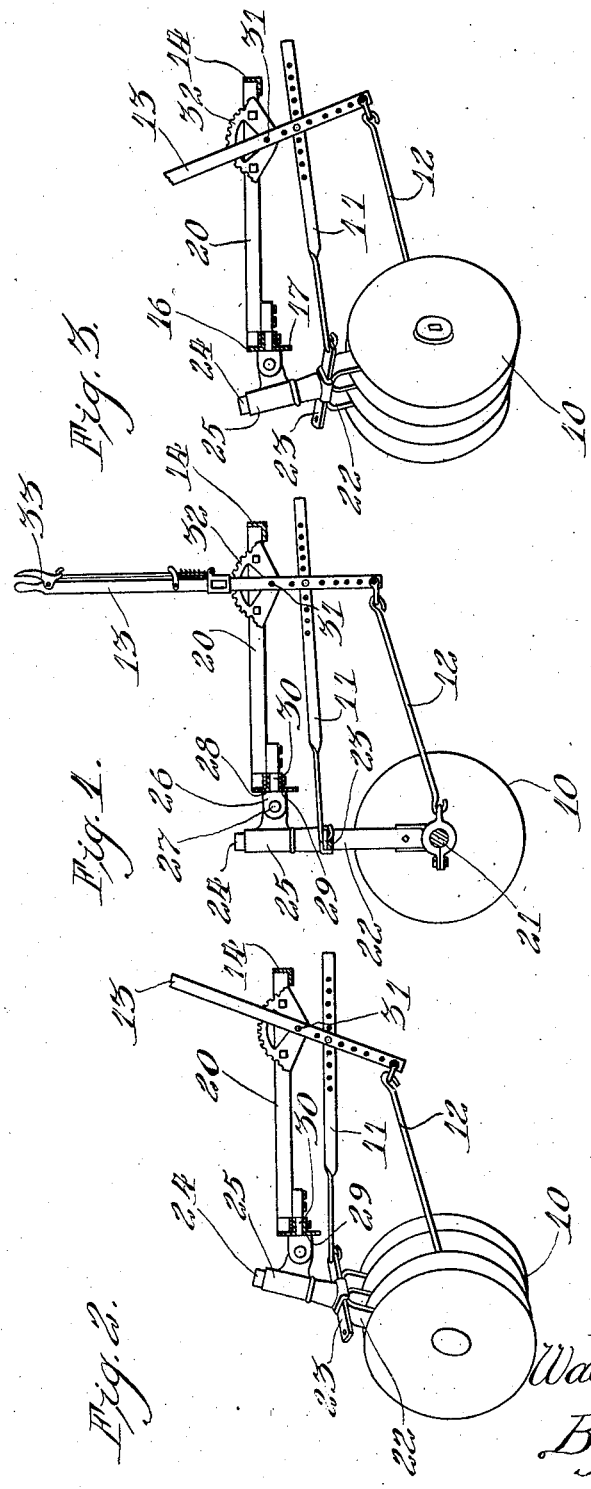

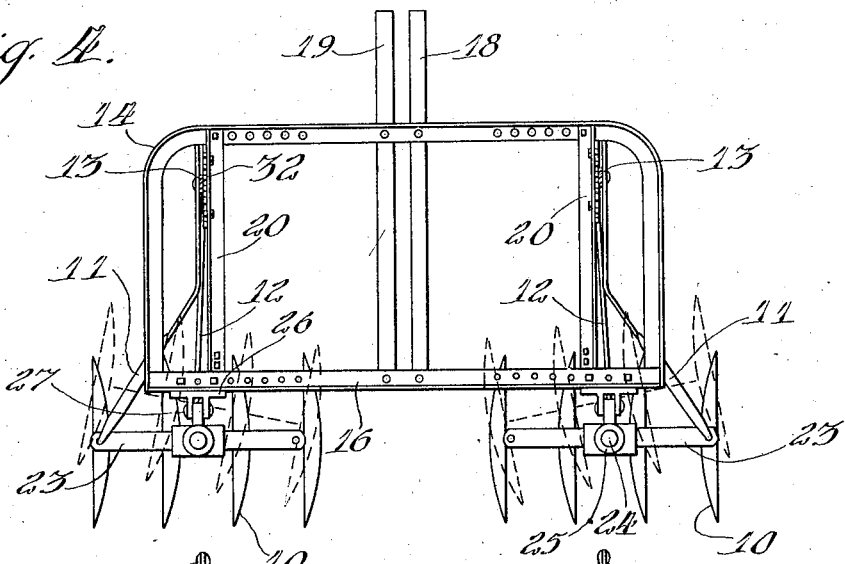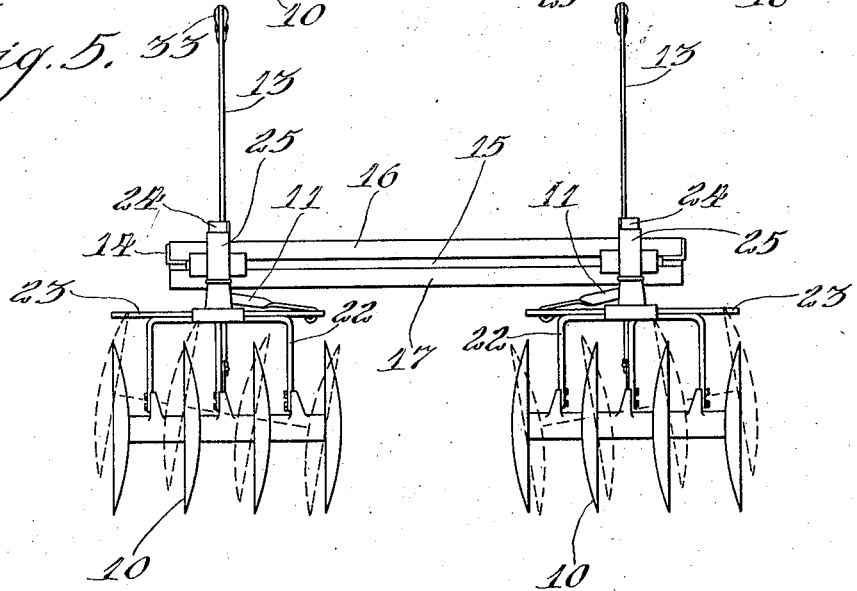

1,769,162

UNITED STATES PATENT OFFICE

WALTER R. PETERSON, OF PARK RIDGE, ILLINOIS, ASSIGNOR TO INTERNATIONAL HARVESTER COMPANY, A CORPORATION OF NEW JERSEY

REVERSIBLE-DISK HARROW

Application filed August 11, 1928. Serial No. 299,018.

This invention relates to improvements in harrows. More specifically, the invention relates to improvements in the controlling mechanisms for reversible disk harrows wherein each reversible disk gang is simultaneously tilted relative to the horizontal and angled relative to the line of draft by a single controller.

An object of the invention is to provide a reversible disk harrow having auxiliary frames transversely adjustable relative to a main frame, each auxiliary frame carrying a reversible disk gang, and a controller having separate connections with the gang, one connection for tilting the gang, and a second connection for angling the gang.

Other objects of the invention will appear as the accompanying description proceeds.

The invention is illustrated by the disclosure in the accompanying drawings, in which:

Figure 1 is a composite vertical section and elevation showing the position of the controlling mechanism when the disk gang is neither tilted relative to the horizontal nor angled relative to the line of draft;

Figure 2 is a view similar to Figure 1, but showing the disk gang both angled and tilted by movement of the controlling mechanism from the position which it occupies in Figure 1;

Figure 3 is a view similar to Figure 2, but showing the disk gang tilted and angled in opposite directions from its tilting and angling as it is indicated in Figure 2;

Figure 4 is a plan of a complete harrow, showing outthrow gangs; and

Figure 5 is a rear elevation of the harrow shown in Figure 1.

The illustrative harrow has a plurality of disk gangs 10, each of such gangs being provided with a controlling mechanism having an upper connection 11 to turn the gang on its upright axis and a lower connection 12 to turn the gang upon its transverse and normally horizontal axis. The controlling mechanism includes a single control lever 13 for each of the disk gangs. When this lever is moved, the associated gang is tilted relative to the horizontal and angled relative to the line of draft.

The disk gangs and their controlling mechanisms are carried by a frame comprising a main frame 14 providing at its rear a transverse horizontal guideway 15. Superposed, vertically spaced members 16 and 17 constitute unitary parts of the main frame 14 forming the guideway 15. The frame also includes longitudinal central draft members 18 and 19 permitting the application of draft to the implement.

Extending longitudinally of the main frame and positioned in the guideway 15 so as to be transversely slidable between the members 16 and 17 are auxiliary frames or supports 20. These auxiliary frames are adjustable transversely of the main frame so as to desirably vary the operation of the implement. Each auxiliary frame carries a controlling mechanism and a disk gang 10, both of the latter being bodily movable with the auxiliary frame transversely of the main frame.

The disks of each disk gang are mounted on an axle 21, which in turn is mounted in an upright gang frame 22. This gang frame carries a reversing bar 23 and an upright post 24. The upright post is rotatably mounted in a journal box 25, this construction permitting the disk gang to turn relative to the frame upon an upright axis, for tilting and angling the gang.

Each journal box 25 is secured to its associated auxiliary frame 20 through the intermediacy of a pivot block 26 and a pivot pin 27, this arrangement permitting the disk gang to turn upon a transverse, horizontal axis relative to its auxiliary frame. Each pivot block is shown as formed with shoulders 28 and 29 on opposite sides of an intermediate portion 30, which slides between the members 16 and 17.

Each controller lever 13 is mounted on its auxiliary frame upon a transverse horizontal axis indicated at 31. Associated with the controller lever is the usual detent bracket 32 and detent mechanism 33.

Beneath the frame each controller or controller lever has a connection 11 pivotally associating one end of the reversing bar 23 with the controller for turning the associated gang upon its upright axis. A second connection between the controller 13 is shown at 12. As illustrated, this connection is between the lower end of the controller lever 13 and the associated disk gang at a position adjacent the axis of the disks of the disk gang. This latter connection mainly turns the gang on its transverse and normally horizontal axis while the gang is turning on its upright axis.

Although the invention has been described with reference to one particular mechanism, it is to be appreciated that it is not limited thereto but is of a scope commensurate with the scope of the appended claims.

What is claimed as new is:

1. A disk harrow comprising, in combination, a main frame, auxiliary frames bodily adjustable transversely of the main frame, a reversible disk gang carried by each auxiliary frame, means for joining each gang to its auxiliary frame so that the gang is turnable on an upright axis and also upon a transverse horizontal axis relative to the auxiliary frame, and controlling mechanism bodily movable with each auxiliary frame and connected with the associated disk gang for simultaneously angling the gang with respect to the line of draft and tilting the gang relative to the horizontal.

2. A reversible disk harrow comprising, in combination, a main support, auxiliary supports secured to the main support so as to be bodily adjustable transversely of the main support, a reversible disk gang for each auxiliary support, a gang frame for each disk gang, an upright post carried by each gang frame, means for connecting the post with the auxiliary support so that the gang is bodily movable with that support relative to the main support and turnable about the upright axis of the post relative to the auxiliary support, other means for connecting the disk gang to an auxiliary support so that the disk gang is bodily movable about a transverse horizontal axis relative to the support, a controller bodily movable with each auxiliary support, and separate connections between each controller and its disk gang for simultaneously angling the disk gang relative to the line of draft and tilting the gang relative to the horizontal by one movement of the controller.

3. A reversible disk harrow comprising, in combination, a support, a pair of reversible disk gangs movable relative to each other and to the support, means for mounting the gangs on the support so that the gangs are independently turnable bodily on upright axes and horizontal transverse axes, a separate controller lever for each disk gang mounted on the support, a connection between each lever and a gang for turning the gang on its upright axis when the lever is moved, and a second connection between each lever and its gang for turning the gang on its horizontal transverse axis simultaneously with its turning on its upright axis.

4. A reversible disk harrow comprising, in combination, a main frame, independently movable reversible disk gangs mounted on the frame, and a single separate controlling lever for each gang for simultaneously angling its gang relative to the line of draft and tilting the gang relative to the horizontal independently of the other gang.

5. A reversible disk harrow comprising, in combination, a frame, disk gangs, a gang frame for each disk gang, an upright post provided on each gang frame, a journal block rotatably receiving each post so as to permit the associated gang to turn relative to the frame on an upright axis, pivotal connections between the frame and the journal block permitting the associated gang to turn relative to the frame on a transverse and normally horizontal axis, a controller lever provide for each gang, means pivotally connecting the controller lever and the frame, means for locking the controller lever in any desired position relative to the frame, means beneath the frame connecting each controller lever with its associated gang frame so as to turn the associated disk gang upon its upright axis when the lever is moved, and means connecting each controller lever with its disk gang so as to turn the gang upon its transverse axis while it is turning upon its upright axis.

6. A reversible disk harrow comprising, in combination, a main frame having transverse members, longitudinally extending auxiliary frames bodily, laterally movable on the main frame along said transverse members and supported thereby, a reversible disk gang secured to and movable with each auxiliary frame, a control lever mounted on each auxiliary frame, and means secured to said lever and to the corresponding disk gang for simultaneously angling the gang relative to the line of draft and tilting the gang relative to a horizontal axis.

In testimony whereof I affix my signature.

WALTER R. PETERSON.